United States Patent [19]
Besserer et al.

[11] Patent Number: 5,794,895
[45] Date of Patent: Aug. 18, 1998

[54] DEVICE FOR SECURING AND GUIDING CABLES AND CONDUITS IN SWITCHGEAR CUBICLES

[75] Inventors: Horst Besserer, Herborn; Hans-Ulrich Deusing, Herborn-Seelbach, both of Germany

[73] Assignee: Rittal-Werk Rudolf Loh GmbH & Co. KG, Herborn, Germany

[21] Appl. No.: 809,253
[22] PCT Filed: Mar. 1, 1996
[86] PCT No.: PCT/EP96/00871
  § 371 Date: Mar. 20, 1997
  § 102(e) Date: Mar. 20, 1997
[87] PCT Pub. No.: WO96/30979
  PCT Pub. Date: Oct. 3, 1996

[30] Foreign Application Priority Data

Mar. 29, 1995 [DE] Germany ............ 195 11 464.7

[51] Int. Cl.⁶ .................... H02B 1/052; H02B 1/20
[52] U.S. Cl. .................................................. 248/73
[58] Field of Search .................. 248/222.12, 73, 248/71

[56] References Cited

U.S. PATENT DOCUMENTS 4,645,154  2/1987  Bly ........................ 248/222.12
5,472,159  12/1995 Kuffel ...................... 24/458 X

FOREIGN PATENT DOCUMENTS

| | | |
|---|---|---|
| 269978 | 7/1968 | Austria . |
| 0061499 | 10/1982 | European Pat. Off. . |
| 2173194 | 10/1973 | France . |
| 1211867 | 9/1966 | Germany . |
| 2119740 | 11/1972 | Germany . |
| 7738445 | 3/1978 | Germany . |
| 1864051 | 12/1982 | Germany . |
| 8802894 | 4/1988 | Germany . |
| 3813002 | 3/1990 | Germany . |
| 9016023 | 2/1991 | Germany . |
| 4013374 | 4/1992 | Germany . |
| 9005400 | 5/1990 | WIPO . |

*Primary Examiner*—James R. Brittain
*Attorney, Agent, or Firm*—Speckman Pauley Petersen & Fejer

[57] ABSTRACT

A device for securing cables and conduits in switchgear cubicles with a securing bracket which is releasably secured to a support, a plate or a rail in the cubicle, and, to receive the cables and conduits has a bracket section projecting from a securing plate which has an inwardly angled end section which is engaged by a cover section that also projects from the securing plate, leaving an insertion aperture. The device can easily be built into switchgear cubicles using simple parts because a catch bracket is used to engage with the securing plate of the securing bracket and because securing side arms of the catch bracket can engage in suitably spaced and sized engagement slots in the support, the plate or the rail.

15 Claims, 1 Drawing Sheet

10

DEVICE FOR SECURING AND GUIDING CABLES AND CONDUITS IN SWITCHGEAR CUBICLES

BACKGROUND OF THE INVENTION

1. Field of the Invention

This invention relates to a device for securing and guiding cables and conduits in switchgear cabinets, having a securing bracket which is releasably connected with a support, a plate or rail of the switchgear cabinet by a fastening plate. For receiving the cables and conduits, the device has a bracket section which projects away from the fastening plate and has an angled end section, which is overlapped by a covering section that projects away from the fastening plate while leaving an insertion opening free.

2. Description of Prior Art

A device of this type is known from PCT International Application WO 90/05400. The securing bracket consists of an angled section of round wire which is connected with an end of a fastening plate. At one end the fastening plate is bent away to form a covering section and overlaps the end section of the section of bent wire, while leaving the insertion opening free. A device of this type is not only expensive to produce, but because of the screw connection needed for fastening the fastening plate, also requires a considerable assembly effort in the switchgear cabinet, in particular, if an installation path over a plurality of devices is required.

A device in accordance with Austrian Patent Reference AT 269 978, which uses cable conduits and which is also fixed on a wall by screw connections, also has the same disadvantages.

SUMMARY OF THE INVENTION

It is one object of this invention to produce a device of the species mentioned at the outset, which includes parts which are simple and cost-efficient to manufacture and can be secured in a simple manner in the switchgear cabinet.

In accordance with this invention, this object is attained with an arresting bracket used as the fastening means, which overlaps the fastening plate of the securing bracket. Lateral legs of the arresting bracket which are embodied as arresting legs can be secured in correspondingly spaced and dimensioned arresting slits of the support, the plate or the rail.

The securing bracket can be produced as a plastic injection-molded element or as a stamped, angled element made of metal, and the arresting bracket as an inexpensive plastic injection-molded element. The arresting bracket is placed on the fastening plate of the securing bracket and, while fixing the securing bracket in place, its lateral legs are arrested in the slits of the support, the plate or the rail. This only requires simple manipulation. The supports, plates or rails having slits can be produced just as simply as supports, plates or rails having bores. But the assembly outlay for installing the devices in the switchgear cabinet is considerably reduced.

To accomplish arresting of the arresting bracket in the slits of rigid supports, plates or rails, in one embodiment of this invention, the arresting bracket has a resilient plastic material, and the clear space between the lateral legs of the arresting bracket and the distance of the slits in the support, the plate or the rail is matched to the width of the fastening plate of the securing bracket.

In this case the layout is such that the lateral legs of the arresting bracket taper in a direction of the free ends, while their clearance is increased in order to obtain a deflection of the lateral legs of the arresting bracket, for making the arrested connections.

Arresting the arresting bracket is simplified because the arresting shoulders rise at a shallow angle from the free ends of the lateral legs of the arresting bracket and terminate in a steeply dropping section.

An arrested connection free of play is achieved by the steeply dropping sections of the arresting shoulders of the lateral legs of the arresting bracket having a distance with respect to shoulders on the inside of the lateral legs which is oriented parallel to the direction in which the arresting bracket is pushed on and which is matched to the thickness of the support, the plate or the rail in an area of the slits plus a thickness of the fastening plate of the securing bracket.

If the sections of the bracket section have longitudinally oriented slits, it is possible to fasten additional elements on the securing bracket. The straps or the like, which are used for fixing the cables or hoses in place on the securing bracket, are secured on the securing bracket.

If the arresting bracket is not fastened, a change to a screw connection can be made, if necessary, if the fastening plate has a keyhole-like screw fastening receptacle.

BRIEF DESCRIPTION OF THE DRAWINGS

This invention will be explained in detail in view of one preferred embodiment represented in the drawings, wherein the figure shows an exploded view of a securing bracket fastened on a support rail and a device, released from the rail, with the securing bracket and the arresting bracket.

DESCRIPTION OF PREFERRED EMBODIMENTS

Figure 1:
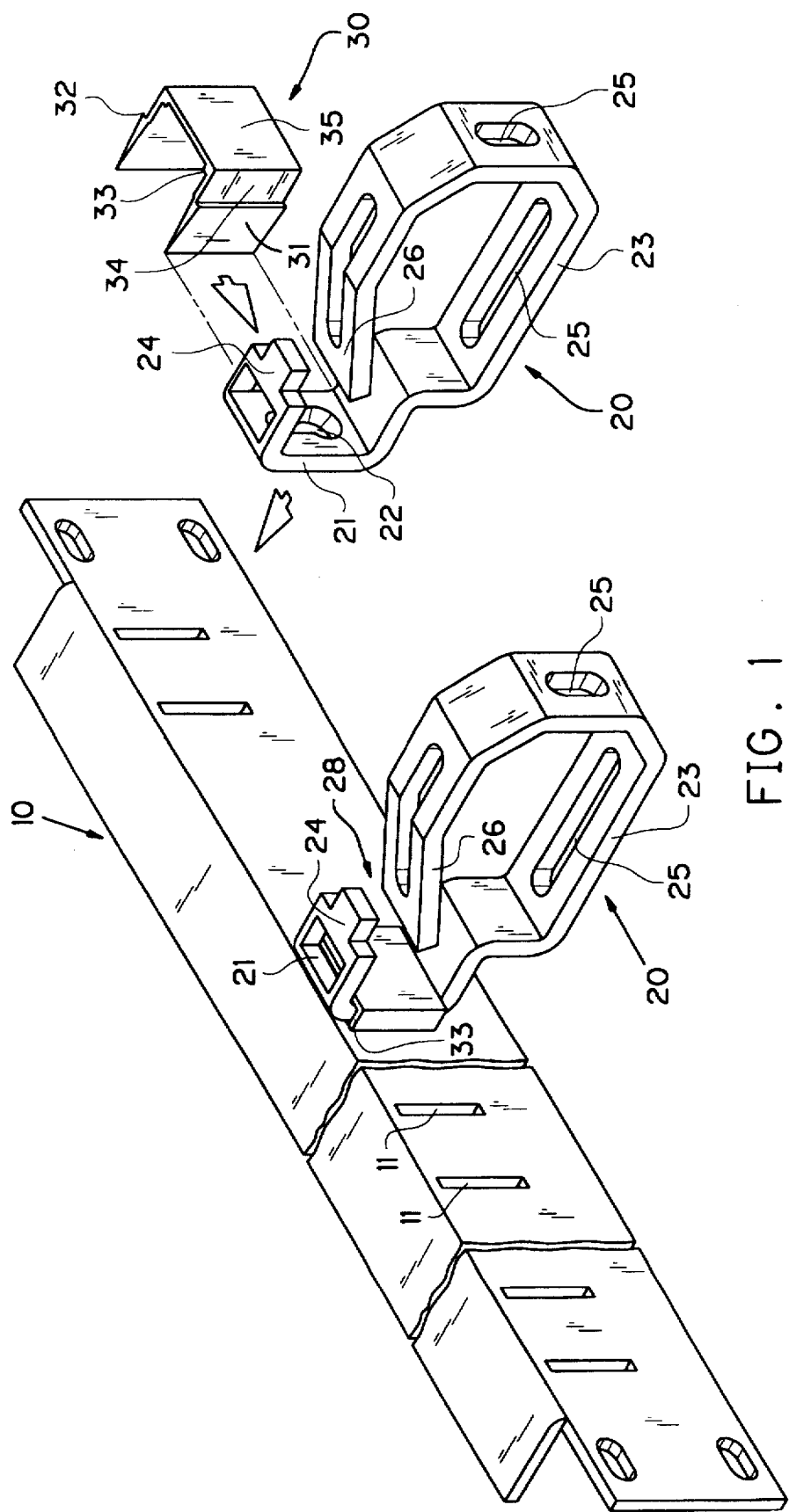

A rail 10, which has beveled rims on its longitudinal edges, has pairs of slits 11, with dimensions matched to associated dimensions of lateral legs 31 and 32 of arresting brackets 30. The arresting bracket 30 has two lateral legs 31 and 32, which taper in a direction toward their free ends so that the lateral legs 31 and 32 can be deflected with respect to each other when arrested in the slits 11. The clear space between the lateral legs 31 and 32 of the arresting bracket 30 corresponds to the distance between the two slits 11 of a pair of slits 11.

The taper of the lateral legs 31 and 32 is such that the clear space increases in a direction toward the free ends of the lateral legs 31 and 32. The lateral legs 31 and 32 of the arresting bracket 30 have arresting shoulders on their exteriors, which rise at a shallow angle from free ends of the lateral legs 31 and 32 and terminate in steeply dropping sections 34. The outsides of the lateral legs 31 and 32 are adapted to the exterior distance between the slits 11, so that after arresting, the sections 34 are arrested behind the rail 10, wherein the deflected lateral legs 31 and 32 return to their initial position because of their inherent elasticity and with their sections 34 at rest in the area of the slits 11 against the back of the rail 10. Facing the center leg 35 of the arresting bracket 30, the insides of the lateral legs 31 and 32 make a transition into shoulders 33, having a distance between them less than the distance between the slits 11 of a pair of slits 11, so that they form a detent and a limit for the arresting movement of the arresting bracket 30. It is intended that in the arrested position the arresting bracket 30 is fixed in place without play on the rail 10. Thus, the distance of the steeply dropping sections 34 of the arresting shoulders on the lateral legs 31 and 32 and of the shoulders 33, which is parallel with the pushing direction, corresponds to a thickness of the rail 10 plus a thickness of the fastening plate 21 of the securing bracket 20. When arrested, the arresting bracket 30 fixes the securing bracket 20 in place without play on the rail 10, which can be seen in the drawing of the securing bracket 20 fixed in place on the rail 10.

The securing bracket 20 has a keyhole-like fastening bore 22 in the fastening plate 21, so that it can also be screwed in place in other locations of the switchgear cabinet, if required. The sections of the bracket section 23 have longitudinally oriented slits 25, which can receive straps or the like for attaching other parts to the securing bracket 20. The end section 26 and the cover section 24 delimit the insertion opening 28 of the securing bracket 20 in a known manner.

The securing bracket 20 is preferably produced as a plastic injection-molded element or a stamped, bent or angled element made of metal, and the arresting bracket 30 as a plastic injection-molded element made of an elastic plastic material.

We claim:

1. In a device for securing and guiding cables in switchgear cabinets, having a securing bracket which is releasably connected with one of a support, a plate and a rail of the switchgear cabinet by a fastening plate, which receives the cables, and having a bracket section which projects away from the fastening plate and has an angled end section, overlapped by a covering section which projects away from the fastening plate while exposing an insertion opening, the improvement comprising:

an arresting bracket (30) overlapping the fastening plate (21) of the securing bracket (20), a plurality of lateral legs (31, 32) of the arresting bracket (30) embodied as arresting legs secured in correspondingly spaced and dimensioned arresting slits (11) of one of the support, the plate and the rail (10), and a clear space between the lateral legs (31, 32) of the arresting bracket (30) and a distance between the arresting slits (11) corresponding to a width of the fastening plate (21) of the securing bracket (20).

2. In a device in accordance with claim 1, wherein the arresting bracket (30) is of a resilient plastic material.

3. In a device in accordance with claim 2, wherein on a plurality of outer surfaces facing away from each other the lateral legs (31, 32) of the arresting bracket (30) have a plurality of arresting shoulders, and a second distance between the outer surfaces correspond to an exterior distance between adjacent pairs of the slits (11).

4. In a device in accordance with claim 3, wherein the arresting shoulders each rise at a relatively shallow angle from the free ends of the lateral legs (31, 32) of the arresting bracket (30) and terminate in steeply dropping sections (34).

5. In a device in accordance with claim 3, wherein the lateral legs (31, 32) of the arresting bracket (30) taper in a direction toward free ends of the lateral legs (31, 32), and a clearance between the lateral legs (31, 32) increases in the direction toward the free ends.

6. In a device in accordance with claim 5, wherein the arresting shoulders rise at a relatively shallow angle from the free ends of the lateral legs (31, 32) of the arresting bracket (30) and terminate in a steeply dropping section (34).

7. In a device in accordance with claim 6, wherein the steeply dropping sections (34) have a third distance between inner shoulders (33) on an inside of the lateral legs (31, 32), which is oriented parallel to a second direction in which the arresting bracket (30 is pushed on and which corresponds to a first thickness of one of the support, the plate and the rail (10) in an area of the slits (11) plus a second thickness of a fastening plate (21) of the securing bracket (20).

8. In a device in accordance with claim 7, wherein a bracket section (23) of the securing bracket (20) has a plurality of longitudinally oriented slits (25).

9. In a device in accordance with claim 8, wherein the fastening plate (21) has a keyhole screw fastening receptacle (22).

10. In a device for securing and guiding cables in switchgear cabinets, having a securing bracket which is releasably connected with one of a support, a plate and a rail of the switchgear cabinet by a fastening plate, which receives the cables, and having a bracket section which projects away from the fastening plate and has an angled end section, overlapped by a covering section which projects away from the fastening plate while exposing an insertion opening, the improvement comprising:

an arresting bracket (30) overlapping the fastening plate (21) of the securing bracket (20), a plurality of lateral legs (31, 32) of the arresting bracket (30) embodied as arresting legs secured in correspondingly spaced and dimensioned arresting slits (11) of one of the support, the plate and the rail (10), on a plurality of outer surfaces facing away from each other the lateral legs (31, 32) of the arresting bracket (30) having a plurality of arresting shoulders, and a distance between the outer surfaces corresponding to an exterior distance between adjacent pairs of the slits (11).

11. In a device for securing and guiding cables in switchgear cabinets, having a securing bracket which is releasably connected with one of a support, a plate and a rail of the switchgear cabinet by a fastening plate, which receives the cables, and having a bracket section which projects away from the fastening plate and has an angled end section, overlapped by a covering section which projects away from the fastening plate while exposing an insertion opening, the improvement comprising:

an arresting bracket (30) overlapping the fastening plate (21) of the securing bracket (20), a plurality of lateral legs (31, 32) of the arresting bracket (30) embodied as arresting legs secured in correspondingly spaced and dimensioned arresting slits (11) of one of the support, the plate and the rail (10), the lateral legs (31, 32) of the arresting bracket (30) tapering in a direction toward free ends of the lateral legs (31, 32), and a clearance between the lateral legs (31, 32) increasing in the direction toward the free ends.

12. In a device in accordance with claim 11, wherein the arresting shoulders each rise at a relatively shallow angle from the free ends of the lateral legs (31, 32) of the arresting bracket (30) and terminate in steeply dropping sections (34).

13. In a device in accordance with claim 12, wherein steeply dropping sections (34) have a distance between inner shoulders (33) on an inside of the lateral legs (31, 32), which is oriented parallel to a second direction in which the arresting bracket (30) is pushed on and which corresponds to a first thickness of one of the support, the plate and the rail (10) in an area of the slits (11) plus a second thickness of a fastening plate (21) of the securing bracket (20).

14. In a device for securing and guiding cables in switchgear cabinets, having a securing bracket which is releasably connected with one of a support, a plate and a rail of the switchgear cabinet by a fastening plate, which receives the cables, and having a bracket section which projects away from the fastening plate and has an angled end section, overlapped by a covering section which projects away from the fastening plate while exposing an insertion opening, the improvement comprising:

an arresting bracket (30) overlapping the fastening plate (21) of the securing bracket (20), a plurality of lateral legs (31, 32) of the arresting bracket (30) embodied as arresting legs secured in correspondingly spaced and dimensioned arresting slits (11) of one of the support, the plate and the rail (10), and a bracket section (23) of the securing bracket (20) having a plurality of longitudinally oriented slits (25).

15. In a device for securing and guiding cables in switchgear cabinets, having a securing bracket which is releasably connected with one of a support, a plate and a rail of the switchgear cabinet by a fastening plate, which receives the cables, and having a bracket section which projects away from the fastening plate and has an angled end section, overlapped by a covering section which projects away from the fastening plate while exposing an insertion opening, the improvement comprising:

an arresting bracket (30) overlapping the fastening plate (21) of the securing bracket (20), a plurality of lateral legs (31, 32) of the arresting bracket (30) embodied as arresting legs secured in correspondingly spaced and dimensioned arresting slits (11) of one of the support, the plate and the rail (10), and the fastening plate (21) having a keyhole screw fastening receptacle (22).

* * * * *